Patented May 11, 1954

2,678,324

UNITED STATES PATENT OFFICE 2,678,324

POLYMERS HAVING A NAPHTHALENE-TYPE NUCLEUS AND A PLURALITY OF TERMINAL FUNCTIONAL GROUPS

Charles G. Goebel, Cincinnati, Ohio, assignor to Emery Industries Inc., Cincinnati, Ohio, a corporation of Ohio No Drawing. Original application March 1, 1946, Serial No. 651,418. Divided and this application June 16, 1951, Serial No. 232,067

3 Claims. (Cl. 260—413)

This invention relates to a new series of chemical compositions which, in their simplest form, are constituted by two long chain aliphatic bodies united by a multi-ring aromatic body at points intermediate the ends of the aliphatic bodies.

This application is a division of my co-pending application entitled "Polyfunctional Compositions," Serial No. 651,418, filed March 1, 1946, now Patent No. 2,573,433. This application is specific to the Friedel-Crafts combination of halogenated saturated long chain aliphatic compounds with conjugated multi-ring aromatic compounds, such as naphthalene. My co-pending application, on the other hand, contains claims which are directed to the combination of two or more long chain aliphatic compounds with an "unconjugated" multi-ring aromatic compound.

The synthesis occurs at the points of unsaturation, or halogenation, of the aliphatic bodies without disturbing the terminal acid groups. In this manner, large and complex molecules may be formed with a plurality of terminal groups which readily enter into further chemical reactions. Inasmuch as various chemical compounds may be joined to either or both of the two acid groups, the molecules are polyfunctional and hence useful in the formation of linear or lattice-type polymers and particularly in the synthesis of fibers, films, resins, and elastomers.

The use of the Friedel-Crafts reaction for joining a fatty acid to an aromatic body is well known in the art, and phenyl stearic acid is a familiar example of the type of product previously obtained. The Friedel-Crafts reaction has also been used for joining several aliphatic bodies to a single aromatic molecule, but the aliphatic bodies have been of short chain length, where more than one was joined, or have been attached through their terminal groups, or both. The Friedel-Crafts reaction has not heretofore been used for incorporating two long chain fatty bodies in a single molecule which is polyfunctional in the sense in which the term is here used.

The linking of the aliphatic components by a multi-ring aromatic compound at points intermediate the ends of the long aliphatic chains not only confers polyfunctional properties upon the compositions of this invention, but enables special properties selectively to be obtained, depending upon the make-up of the long chain aliphatic and the aromatic components which are condensed.

While the invention in its simplest form comprehends the condensation of two moles of aliphatic material with one mole of a two ring aromatic, the invention is adapted for the formation of still more complex molecules, for instance, by the utilization of three moles of doubly unsaturated aliphatic bodies and two moles of the linking double ring aromatic compound. Alternatively, three moles of mono-unsaturated aliphatic material may be condensed with one mole of an aromatic compound having three benzene rings. By utilizing the principles of this invention, a wide and almost infinite variety of individual chemical compounds may be synthesized.

Thus, the properties of the individual polyfunctional molecules may differ from one another not only in respect to the identity of the aliphatic chains or either or any of them, the identity of the aromatic compound or compounds selected to join them, but also in respect to the quantitative relationship of aliphatic to aromatic components which, in turn, must be determined and selected in relation to both the reactive capacities of the starting materials and the end product desired.

While I prefer to practice the invention by utilizing the unsaturated fatty acids obtained from natural fats and oils, as the aliphatic component of the composition, the Friedel-Crafts synthesis proceeds equally well with halogenated, usually chlorinated, fatty materials; so as an alternative to the use of the unsaturated fatty bodies, the chlorinated products may be employed. Since the chlorine is removed from the fatty bodies by the Friedel-Crafts condensation, the polyfunctional molecules are similar regardless of whether unsaturated or chlorinated aliphatics were used as the starting material.

The unsaturated materials are found abundantly in nature and their use is recommended by their availability, but on the other hand, chlorination permits the use of saturated aliphatics, which have no unsaturated counterparts, and control of the conditions of chlorinating permits considerable latitude in the selection of the linkage spots constituted by the chlorine substitution in the aliphatic chains.

The fatty materials particularly adapted to be used as the aliphatic components of the synthetic molecules of this invention are the products generally obtained from the animal, vegetable, and marine fats and oils which are preferably hydrolyzed to fatty acids, which have been used for illustration in describing the invention. Obviously, however, these fatty acids may be reacted or modified in whole or in part before synthesis as well as after synthesis. Thus, the esters of the fatty acids may be used in their place and likewise the corresponding alcohols, amides, and nitriles. Also unsaturated fatty acids or bodies can be destructibly oxidized to produce scission at the double bonds and the chlorinated derivatives of the resulting saturated products used in the synthesis with aromatics.

The aliphatic compounds within the scope of this invention are, therefore, fatty materials of from nine to twenty-four carbon atoms chain length, characterized by the presence of a double bond or a halogen atom, intermediate the ends of the chain. Aliphatic materials of synthetic origin corresponding to those described may be used as equivalents.

The aromatic compounds adapted to be used in the synthesis of the invention are those which have two or more rings. If the proposed synthesis is to be with an unsaturated aliphatic, then the aromatic compounds must be unconjugated. By "unconjugated," I mean aromatic compounds containing two or more rings linked by either a single bond or some other atom or group of atoms such as carbon or oxygen. For example, such compounds as diphenyl, diphenyl oxide, tri phenyl methane, etc. can be used. Aromatic compounds having two or more conjugated rings, e. g. naphthalene, anthracene, phenanthrene and their homologs may also be employed in the synthesis. However, with an aromatic compound having conjugated rings, a halogenated aliphatic compound rather than an unsaturated one is required.

The reaction of two moles of fatty body to one mole of aromatic is one which can be written as follows where $R_1$ and $R_2$ are of the group consisting of fatty acids and derivatives of fatty acids and X is an aromatic compound having at least two rings.

$$R_1 + R_2 + X \xrightarrow{AlCl_3} R_1XR_2$$

Where two moles of the aromatic compound are reacted with three moles of unsaturated or halogenated fatty material, the reaction can be written as follows where $R_3$, $R_4$ and $R_5$ are of the group consisting of unsaturated fatty acids and derivatives of unsaturated fatty acids, and X and Y are aromatic compounds having at least two rings.

$$R_3 + R_4 + R_5 + X + Y \xrightarrow{AlCl_3} R_3XR_4YR_5$$

Longer condensation products can be made if three or more moles of aromatic compound are reacted with four or more moles of unsaturated or halogenated material, there being for each condensation product one more mole of fatty than of aromatic material. An illustrative reaction is of the following, where R is a fatty acid or derivative of a fatty acid, X is an aroamtic compound having at least two rings, $n$ is a whole number between 1 and 4, and fatty and aromatic portions of the condensation product are connected together alternately.

$$(n+1)R + nX \xrightarrow{AlCl_3} (n+1)R \cdot nX$$

It may be possible to produce compounds of the above formula where $n$ is a number greater than 4, but in attempts to form such products reactants must be employed in nearly mole to mole ratios, and the tendency is to form simple mole for mole reaction products.

An aromatic molecule may be employed in which there are more than two uncondensed rings. If this is done, additional fatty molecules can be condensed by a reaction which may be written as follows, where R is a fatty substance of the type already described, $m$ is a whole number and Z is an aromatic compound having $m$ uncondensed unconjugated rings.

$$mR + Z \xrightarrow{AlCl_3} mR \cdot Z$$

The foregoing reactions are given as illustrations of the many which can occur. Many other reactions will be apparent to one skilled in the are and the illustrations are not intended to limit the scope of the invention.

The method of carrying out the condensation reaction is, of course, subject to some variation depending upon the solubilities and quantities of reactants employed, but in general, may be carried out in the following manner:

Two moles of halogenated acid or unsaturated acid, or derivative, and one mole of aromatic compound are dissolved in a solvent such as cyclohexane, ortho dichlorobenzene or a saturated petroleum hydrocarbon solvent. Any solvent which is a suitable solvent for the reactants, and which does not react in the Friedel-Crafts reaction or with any ingredient may be employed. The use of a solvent is not an essential part of the reaction as the same products can be obtained in the absence of a solvent. The solvent method, however, is more convenient and provides somewhat better yields. From three to five parts of solvent per one part of fatty acid or derivative has been found to be a suitable amount to insure fluidity of the mix and ease of handling.

Anhydrous aluminum chloride is then added slowly with agitation. The aluminum chloride should ber easonably finely divided, but need not be powdered. The addition of the aluminum chloride will usually require from one to three hours, during which time the temperature is controlled between 0° to 55° centigrade. The reaction is then allowed to continue for a period of about three hours at a temperature of from 40° to 100° centigrade. The optimum temperature to obtain the best yield and color varies with the nature of the reacting ingredients. Further specific examples of the temperatures required are shown below. For other compounds, the most desirable temperatures can readily be determined by trial.

At the end of the reacting period, the aluminum soaps and/or complexes formed are decomposed by treating the reaction product with dilute mineral acid; a 10 to 25 percent solution of sulphuric or hydrochloric acid is satisfactory. The solvent solution of the product is then washed thoroughly with water to remove traces of mineral acidity, a fraction of a percent of soda ash added, and the solvent then removed by distillation and recovered for reuse. The residue in the still has been found, in general, to contain from 70 to 95 percent of the desired polyfunctional material. If desired, any content of monomeric products may be removed by distilling off under high vacuum.

The final products are generally rather viscous, oily bodies, the color ranging from a light straw to reddish brown, depending upon the quality of ingredients used and temperatures employed. As a rule, lower reacting temperatures result in lighter colors.

The products obtained have wide application in the formulation of resins for coatings. Thus, the dibasic acid produced from oleic acid and diphenyl oxide may be reacted with glycerine to produce a solvent-soluble resin of the alkyd type which can be baked to a tough insoluble film. The mixed dibasic and polybasic acids from soyabean oil produce tough resins with diamines such as ethylene diamine.

Specific uses of these products constitute the subject matter of my co-pending applications.

The following specific examples more fully illustrate my invention and are given for the benefit of those skilled in the art, but the invention is not limited thereby except as defined in the claims.

Example No. 1

165 parts of chlorostearic acid prepared by an acetone solvent separation of a partially chlorinated commercial stearic acid and containing 14.5 percent chlorine were dissolved together with 32 parts of naphthalene in 350 parts of a hydrocarbon solvent. 80 parts of anhydrous aluminum chloride was then added with agitation over a one-hour period at 20° to 30° centigrade. The temperature was increased to 50° to 55° centigrade and maintained at this level for an additional two hours. The excess aluminum chloride and active complexes were deactivated in an atmosphere of steam. A volume of 25 percent hydrochloric acid solution equal to the volume of the product mixture was added at 50° to 65° centigrade to break up aluminum soaps and complexes. The hydrocarbon solution was then washed free of mineral acid with water followed by a distillation under reduced pressure to remove the solvent and unreacted starting materials. In this way, there was obtained a viscous liquid product in approximately 87 percent yield and having the following analytical constants compared to the original chloro acid:

|  | Iodine Value | Neutral Equivalent | Percent Chlorine |
|---|---|---|---|
| Chlorostearic acid | 0 | 330 | 14.5 |
| Dibasic Acid Material | 19 | 379 | 0.91 |

Example No. 2

Dichlorostearic acid (average 2.1 atoms of chlorine per molecule) (177 parts) and naphthalene (70 parts) were dissolved in o-dichlorobenzene (450 parts). Granulated aluminum chloride (100 parts) was added to this agitated solution over a one-hour period while the temperature was controlled between 20° to 30° centigrade by rate of addition of $AlCl_3$ and cooling. The temperature was raised to and maintained at 50° to 55° centigrade for two hours.

Two aluminum soaps and complexes were decomposed by treating the reaction mass with 25 percent HCl solution. The acid water was withdrawn and the o-dichlorobenzene solvent was removed by distillation.

The very viscous oil can be treated with a suitable amount of bleaching earth to improve its color. It had a neutral equivalent of 381, an iodine value of 25 to 29, and a chlorine content of 5.4 percent. Corresponding values for the starting chlorostearic acid were 353, 1, and 21.6 respectively.

The condensation product on being heated with diethylene glycol set up to an infusible mass which was insoluble in organic solvents indicating that considerable trimeric and higher polymeric acid bodies were present.

Having described my invention, I claim:

1. A composition of matter which has at least two functional terminal groups, said composition comprising: the product of a Friedel-Crafts synthesis wherein each mole of an aromatic compound having at least two conjugated benzene rings is combined with at least two moles of halogenated aliphatic compound of at least one of the classes of the group consisting of: carboxylic acids, esters, amides and nitriles, the said halogenated aliphatic compounds having a chain length of 9-24 carbon atoms.

2. A process of making compositions which have at least two functional terminal groups which process comprises: subjecting to a Friedel-Crafts condensation aromatic compound having at least two conjugated benzene rings with at least two molar equivalents thereof of halogenated aliphatic compound of at least one of the classes of the group consisting of: carboxylic acids, esters, amides and nitriles, the said halogenated aliphatic compounds having a chain length of between 9 and 24 carbon atoms.

3. As a composition of matter, the product of a Friedel-Crafts synthesis of naphthalene and chlorostearic acid wherein each mole of naphthalene is combined with two moles of chlorostearic acid.

References Cited in the file of this patent

UNITED STATES PATENTS

| Number | Name | Date |
|---|---|---|
| 2,475,916 | Reiff et al. | July 12, 1949 |
| 2,573,433 | Goebel | Oct. 30, 1951 |